(12) United States Patent
Prophete et al.

(10) Patent No.: US 8,407,184 B2
(45) Date of Patent: Mar. 26, 2013

(54) MAINTAINING APPLICATIONS THAT ARE OCCASIONALLY CONNECTED TO AN ONLINE SERVICES SYSTEM

(75) Inventors: Didier Prophete, San Francisco, CA (US); Ronald Fischer, San Francisco, CA (US); Mark Movida, Berkeley, CA (US); Artur Kesel, Daly City, CA (US); Amol Hardikar, San Francisco, CA (US); Madhav Pathak, Union City, CA (US); Sönke Rohde, San Francisco, CA (US); Markus Spohn, Foster City, CA (US); Marni Gasn, San Mateo, CA (US); Anshu Agarwal, San Francisco, CA (US); Krzysztof Oblucki, Oakland, CA (US)

(73) Assignee: Salesforce.com, Inc., San Francisco, CA (US)

( * ) Notice: Subject to any disclaimer, the term of this patent is extended or adjusted under 35 U.S.C. 154(b) by 229 days.

(21) Appl. No.: 12/838,388

(22) Filed: Jul. 16, 2010

(65) Prior Publication Data
US 2011/0302135 A1    Dec. 8, 2011

Related U.S. Application Data

(60) Provisional application No. 61/352,312, filed on Jun. 7, 2010, provisional application No. 61/357,070, filed on Jun. 21, 2010, provisional application No. 61/352,274, filed on Jun. 7, 2010.

(51) Int. Cl.
    *G06F 7/00*     (2006.01)
    *G06F 17/00*    (2006.01)
(52) U.S. Cl. ........................................ 707/634
(58) Field of Classification Search .............. 707/600, 707/602, 610, 615, 619, 626, 634
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Mariela Reyes
*Assistant Examiner* — Nicholas Allen
(74) *Attorney, Agent, or Firm* — Ingrassia Fisher & Lorenz, P.C.

(57) ABSTRACT

In a method for maintaining applications that are occasionally connected to an online services system, metadata describing at least a portion of an online services database is retrieved and the portion of the online services database is authorized for replication at a software application, information for an entity for an application database in accordance with metadata is determined, information is sent for the entity to an application data management service, data for the software application is retrieved from the online services database in accordance with metadata, at least a portion of the data for the software application is sent to the application data management service and the portion of the data for the software application should be synchronized with the online services database, a request for information is received for rendering a component of a user interface, and information is provided for rendering the component of the user interface for the software application.

20 Claims, 12 Drawing Sheets

U.S. PATENT DOCUMENTS

| | | |
|---|---|---|
| 6,253,211 B1 * | 6/2001 | Gillies et al. .................. 707/610 |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,853,974 B1 * | 2/2005 | Akifuji et al. ................. 705/7.26 |
| 7,340,411 B2 | 3/2008 | Cook |
| 7,496,903 B2 | 2/2009 | Rees et al. |
| 7,620,655 B2 | 11/2009 | Larsson et al. |
| 7,788,536 B1 | 8/2010 | Qureshi et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120593 A1 | 6/2003 | Bansal et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0237081 A1 * | 12/2003 | Taylor .......................... 717/168 |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0039171 A1 | 2/2005 | Avakian et al. |
| 2005/0050555 A1 | 3/2005 | Exley et al. |
| 2005/0091098 A1 | 4/2005 | Brodersen et al. |
| 2007/0100834 A1 * | 5/2007 | Landry et al. ................... 707/10 |
| 2009/0077114 A1 * | 3/2009 | Zachariah ..................... 707/102 |
| 2011/0078113 A1 * | 3/2011 | Franz ........................... 707/634 |

* cited by examiner

Mobile Configuration
Test

« Back to List: Mobile Configuration

Below is the information for this mobile configuration. Click Edit to make changes.

Mobile Configuration Detail  [Edit] [Delete] [Clone]

| | |
|---|---|
| Name | Test |
| Description | |
| Created By | Admin User, 5/14/2009 3:16 PM |
| | Active ✓ |
| Modified By | Admin User, 7/21/2009 1:47 PM |

Assigned Profiles                                                    Assigned Profiles Help

| Name | Type |
|---|---|
| System Administrator | Profile |
| Test | Profile |

Data Sets  [Edit]                                                    Data Sets Help

| Object | Ownership Filter | Field Filter | Max Records | Order By |
|---|---|---|---|---|
| Opportunity | User's Records | | No Limit | |
| └ Account (Referenced by Opportunity) | All Records | | No Limit | |
|    └ Contact | All Records | | No Limit | |
|    └ Event | All Records | | No Limit | |
|    └ Task | All Records | | No Limit | |
| Account | All Records | Region equals Asia/Pacific | No Limit | |
| Product | All Records | | No Limit | |
| Foo | All Records | | No Limit | |

Salesforce Conflict Resolution

Salesforce found errors while syncing your data. To resolve, enter the correct values. If you do not correct an error now, you can fix it the next time you sync.

| Record Name | Field Name | Error | Outlook/Offline Value |
|---|---|---|---|
| Contacts (2 records, 2 errors) | | | |
| Joseph Gillespie | Phone Number | Invalid Value. Must contain '+1' at beginning of value. | (415)555-5463 |
| Jon Jacobs | Reports To | Contact does not exist or you may not have access to this contact. Contact your administrator. | Marta Stein |
| Events (2 records, 2 errors) | | | |
| All Hands Meeting | | Record no longer exists in Salesforce | Select a Value... |
| Salesforce Admin Training | End Date | End Date must be after start date | 12/20/2008  4:00PM |

Cancel    Back to Conflicts    Continue to Summary

FIG. 6a

Account Name  James 2
Billing Address  178 Marview Way
San Francisco, Ca 94131
frenchman
Parent Account  testRayX2
Type  Competitor
Website  http://www.12345asdf.net
Created Date  02/12/2010 10:35 AM
Annual Revenue  $ 13123123

FIG. 6c

Account details

| | |
|---|---|
| Account Owner | Shankar Srinivasan |
| Account Name | Michael Jackson |
| Parent Account | |
| | Phone |
| | Fax |
| | Website http://google |

Custom Fields

| | | | | |
|---|---|---|---|---|
| Business Partner Type | Enterprise | | Cust_AutoNumber | A-00687 |
| Business Partner | Salesforce.com | | Cust_DateFormula | |
| Contact | | | Cust_CurrencyFormula | $ 0.00 |
| Cust_Opportunity | | | Cust_DateTimeFormula | 03/12/2010 3:57 PM |
| Cust_Checkbox | ✓ | | Cust_NumberFormula | 0.00 |
| Cust_Currency | $ 20.00 | | Cust_PercentFormula | 0.00% |
| Cust_Date | 03/24/2010 | | Cust_TextFormula | Michael Jackson |
| Cust_DateTime | 03/26/2010 12:30 AM | | Cust_Summary | 0 |
| Cust_Email | didier@sfdc.com | | Cust_MultiSelectPicklist | |
| Cust_Number | 10.00 | | Cust_TextAreaLong | |
| Cust_Percent | | | | |
| Cust_Phone | | | | |
| Cust_Picklist | | | | |
| Cust_Text | | | | |
| Cust_TextArea | | | | |
| Cust_URL | | | | |

Additional Information

| | | | | |
|---|---|---|---|---|
| Type | Customer | | Employees | 0 |
| Industry | Apparel | | Annual Revenue | $ 0 |
| DUNS Number | | | | |
| Description | Account description | | | |

Address Information

| | | | |
|---|---|---|---|
| Billing Address | | Shipping Address | |

System Information

| | | | |
|---|---|---|---|
| Created By | Shankar Srinivasan, 03/09/2010 3:18 PM | Last Modified By | Shankar Srinivasan, 03/11/2010 3:57 PM |

FIG. 6d

MAINTAINING APPLICATIONS THAT ARE OCCASIONALLY CONNECTED TO AN ONLINE SERVICES SYSTEM

CLAIM OF PRIORITY

This application claims the benefit of U.S. Provisional Patent Application 61/352,312 entitled "Methods and Systems for maintaining data consistency between a client and server in a multi-tenant database system," filed on Jun. 7, 2010, Prophete et al., the entire contents of which are incorporated herein by reference, U.S. Provisional Patent Application 61/357,070, entitled "Methods and Systems for using smart widgets in a multi-tenant database environment," filed on Jun. 21, 2010, Prophete et al., the entire contents of which are incorporated herein by reference, and U.S. Provisional Patent Application 61/352,274, entitled "Methods and systems for resolving conflicting client/server data in a multi-tenant database environment," filed on Jun. 7, 2010, Prophete et al., the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to applications occasionally connected to an online service system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Unfortunately when some third-party software is used with a conventional database system, data management software for the third party software may be installed at a database server for the conventional database. Installation of third party software at a database server for a multi-tenant database may not be feasible because installation of the software at the server that handles data for multiple customers presents security risks.

BRIEF SUMMARY

In accordance with embodiments, there are provided methods, computer readable mediums and apparatuses for maintaining applications that are occasionally connected to an online services system.

In an embodiment and by way of example, metadata describing at least a portion of an online services database is retrieved and the portion of the online services database is authorized for replication at a software application, information for an entity for an application database in accordance with metadata is determined, information is sent for the entity to an application data management service, data for the software application is retrieved from the online services database in accordance with metadata, at least a portion of the data for the software application is sent to the application data management service and the portion of the data for the software application should be synchronized with the online services database, a request for information is received for rendering a component of a user interface, and information is provided for rendering the component of the user interface for the software application Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 5a illustrates a screenshot of an administration console for an implementation of maintaining an application occasionally connected to an online services system.

FIG. 5b illustrates a screenshot of an administration console for an implementation of maintaining an application occasionally connected to an online services system.

FIG. 6a illustrates a screenshot of a conflict resolution user interface for an implementation of maintaining an application occasionally connected to an online services system.

FIG. 6c illustrates a screenshot of a user interface for an implementation of maintaining an application occasionally connected to an online services system.

FIG. 6d illustrates a screenshot of a user interface for an implementation of maintaining an application occasionally connected to an online services system.

DETAILED DESCRIPTION

General Overview

Systems, methods, computer readable mediums, and computer program products are provided for maintaining applications that are occasionally connected to an online services system. Embodiments of the present invention provide a framework or infrastructure that allows for the development of software applications that may work online or connected over a network with an online services system as well as run seamlessly offline or disconnected from the online services system. The inventors note a need for an approach for an application framework that is platform independent and does not require third-party software dedicated to the application to be installed and executing at the at the online service system. Embodiments of the present invention provide a framework that allows development of applications that may replicate the data located at an online service, synchronize with the data located at an online service, translate commands between a local database and an online services database, and render user interface components.

In one or more embodiments, the application framework provides for the replication and the synchronization of data from a remote database system of an online services system. In a preferred embodiment, the remote database system is a multi-tenant database system. An application implemented with the application framework may access or manipulate an online services data whether the application is connected or disconnected from the online service. Embodiments of the application framework may provide conflict resolution, user interface components, translation of operations performed on data both at the offline application and the online services system, and bug management capabilities.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, methods, apparatuses, and computer readable mediums for maintaining applications that are occasionally connected to an online services system will be described with reference to example embodiments.

Figure 1:
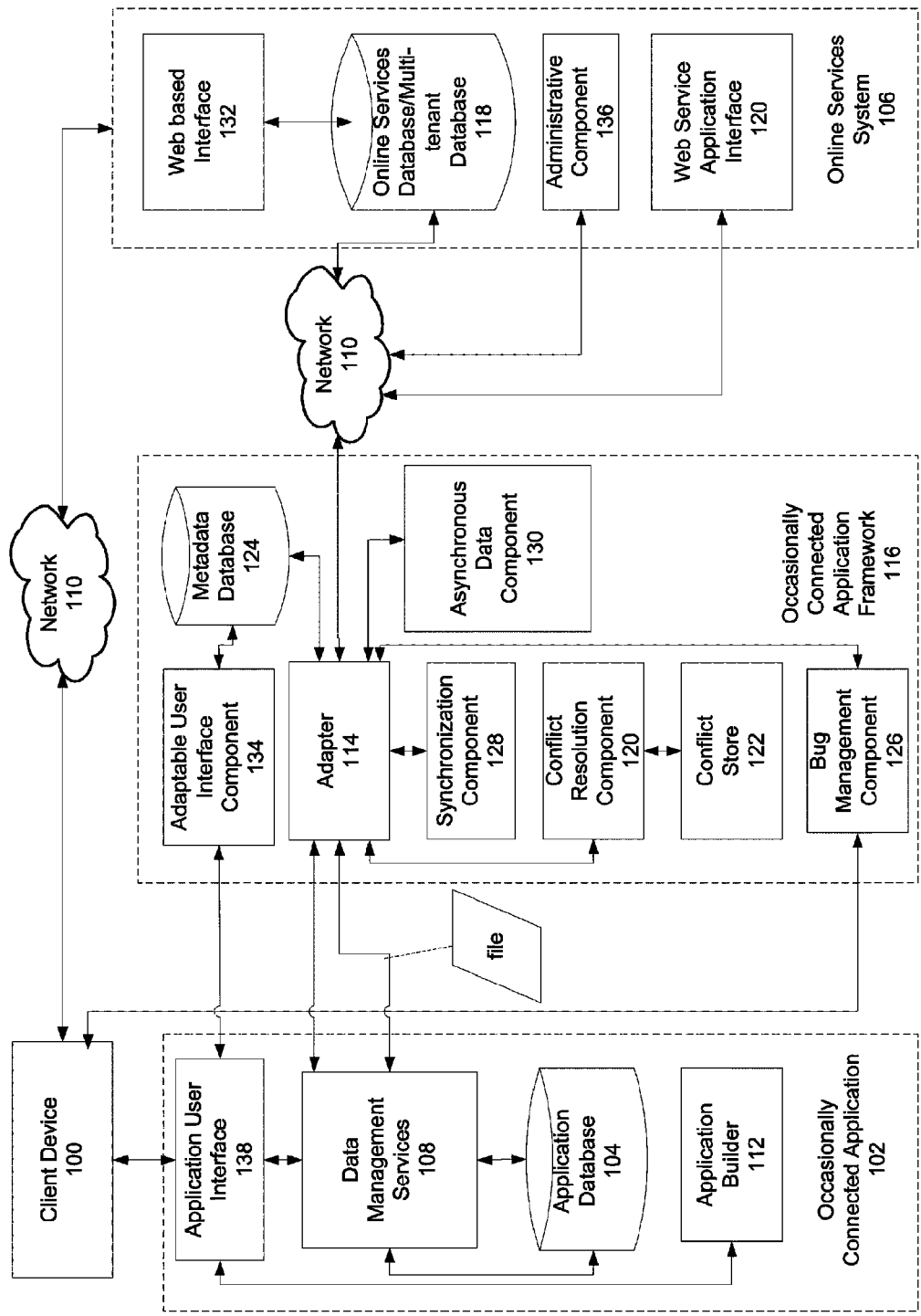
FIG. 1 illustrates a block diagram of an example of an implementation of an application occasionally connected to an online services system.

FIG. 1 illustrates a block diagram of an example of an implementation of an occasionally online application. Client Device 100 may have an Occasionally Connected Application 102 stored and able to be executed on the Client Device 100. As will be appreciated by those skilled in the art, the functional elements of Occasionally Connected Application 102 as illustrated in FIG. 1, are provided as an example, and various implementations of the system may have subsets of the functional elements and/or subsets may be distributed among various computer systems. Client Device 100 may include, but is not limited to, a mobile device, a smart phone, an Apple iPhone™, a cellular phone, a BlackBerry® device, a personal digital assistant (PDA), a mp3 player, a laptop, a computer, or any other type of computer system. In a preferred embodiment, the Occasionally Connected Application 102 is a stand-alone application installed on the Client Device 100 with a local Application Database 104. In another embodiment, the Client Device 100 may have a browser-based application and the Application Database 104 may be remote to the Client Device 104.

The Application Database 104 stores data that may be used, accessed, or manipulated while the Occasionally Connected Application 102 is offline or disconnected from a Network 110 and/or unable to directly use the Online Services System 106. A database is any collection of data that may be stored and queried for retrieval of the stored data. Implementations of a database include, but are not limited to, multi-tenant databases, relational databases, object-oriented databases, and file systems. The database may have a database server or a database management system for receiving requests and sending responses to requests for the database, such as query requests. In a preferred embodiment, the Application Database 104 is a SQLite relational database. The Occasionally Connected Application 102 may have a Data Management Services 108 to handle operations (e.g., create, read, update, and delete) for the Application Database 104 used by the Occasionally Connected Application 102.

Optionally, the Occasionally Connected Application 102 may utilize an Application Builder 112 to create the Occasionally Connected Application 102 and associated Application User Interface 138. In a preferred embodiment, an Application Builder 112 may be an integrated development environment, such as Adobe Flash Builder, or a cross platform runtime environment, such as Adobe Air. The Application Builder 112 may allow for a pluggable adapter to communicate with Data Management Services 108.

The Data Management Services 108 may communicate with the Adapter 114 of the Occasionally Connected Application Framework 116 to synchronize and replicate data in the Application Database 104 and the Online Services Database/Multi-tenant Database 118 of the Online Services System 106. The Data Management Services 108 may act as a synchronization engine for the Occasionally Connected Application 102. The Data Management Services 108 may store operations to be executed or that have been executed on data that is both stored locally (e.g., Application Database 104) and at other remote locations (e.g., Multi-tenant Database 118). Although an implementation is described with reference to the use of a multi-tenant database as an online services database, those skilled in the art will recognize that the online services database may be implemented with alternative types of databases.

The Adapter 114 may provide a translation service to translate operations executed against the Application Database 104 into operations understood by the Multi-tenant Database 118 in order to synchronize data between the databases. In a preferred embodiment, a Web Service Application Interface 120, such as a SOAP API, is used by the Adapter 114 to communicate the translated operations executed on the data at the Application Database 104 to the Online Services System 106. The Adapter 114 makes Simple Object Access Protocol (SOAP) calls over Hypertext Transport Protocol (HTTP) to the Online Services System 106 to communicate the translated operations.

When the Adapter 114 communicates the translated commands to be executed on the Multi-tenant Database 118, conflicts may arise. For example, conflicts may arise because the underlying data that the command concerns has been altered on the Multi-tenant Database 118 while the Occasionally Connected Application 102 was offline or since the last synchronization. Errors may also occur when the translated commands are executed against the Multi-tenant Database 118 and the Multi-tenant Database 118 enforces validation rules that are not enforced at the Application Database 104.

In one or more embodiments, the Adapter 114 may identify that there are conflicts with operations prior to attempting to execute the operations at the Multi-tenant Database 118 using the received metadata. For example, a conflict may be apparent when the received metadata indicates that an entity or record has been removed or is no longer available for manipulation by the user, and a stored operation involves the entity.

The Occasionally Connected Application Framework 116 provides a Conflict Resolution Component 120 for handling conflict resolution between the Multi-tenant Database 118 and the Application Database 104. Conflicts/Errors are stored in a Conflict Store 122 and the user has the option to review and resolve conflicts with a conflict user interface provided by the Occasionally Connected Framework 116.

The Adapter 114 may be used to replicate at least a portion of the schema and data at the Multi-tenant Database 118 for the Occasionally Connected Application 102. The Adapter 114 adapts data from Multi-tenant Database 118 to go into the Application Database 104 for the Occasionally Connected Application 102. The Data Management Services 108 may generate a database schema based on the information provided by the Adapter 114. In one or more embodiments, the Adapter 114 retrieves metadata from the Multi-tenant Database 118 that provides a description of the database so that the relevant portion of the database can be replicated at the Occasionally Connected Application 102. The metadata retrieved by the Adapter 114 may be stored in the Metadata Database 124. The information indicated by the metadata may be communicated by the Adapter 114 to the Data Management Services 108 to generate a schema or alter a portion of a schema for the Application Database 104.

In one or more embodiments, the Adapter 114 may communicate the information about entities in the metadata with an Extensible Markup Language (XML) file to the Data Management Services 108. The Data Management Services 108 may take the XML file that describes the records and entities to be used by the Occasionally Connected Application 102 and generate a schema for the Application Database 104. In a preferred embodiment, introspection is performed on a Web Service Description Language (WSDL) file for the Online Services System 106 to produce the XML file sent to Data Management Services 108 to initially create the Application Database 104. WSDL is an XML-based language that provides a model for describing Web services. The XML file may be used by a script to generate classes to instantiate remote objects (including remote methods) to access each entity in the Multi-tenant Database 118 and to create tables in the Application Database 104. In a preferred embodiment, the generated classes have properties or fields that are bindable. A class that has bindable properties may provide notification when the property has changed.

Scripts may also use the XML file to generate classes to access the data in the Application Database 104 and the classes may be instantiated to allow for accessing data in the Application Database 104 when the Occasionally Connected Application 102 is offline. Each class generated by the script may represent an entity, table, or record in the Multi-tenant Database 118. In a preferred embodiment, Adobe Fiber is used to generate remote objects, create the local database, and objects used locally to access and manipulate data at the local database.

The metadata may have data that describes entities or records stored within the Online Services System 106. The metadata may describe entities or records that are internally used by the Online Services System 106 as well as entities or records that are displayed to the user with the Adaptable User Interface Components 134 to allow for manipulation of the data with the Occasionally Connected Application 102. For example, the Online Services System 106 may have a set of records for bug management that are used internally for logging errors that happen during execution of the Occasionally Online Application 102. The user may log bugs and/or the Occasionally Connected Application 102 may log errors that occur during execution in a record/entity at the Application Database 104 and the data in the record/entity for bug management may be synchronized with the data for the entity at the Multi-tenant Database 118. In another example, the Online Services System 106 may have records for accounts for users at the Online Services System 106 that are used internally to store login/password for the user and/or a user role. The Occasionally Connected Application Framework 116 provides a Bug Management Component 126 for handling bugs reported and generating the user interface for handling bugs at the Occasionally Connected Application 102.

The metadata may provide information on the user interface of the Online Services System 106. For example, the metadata may include, but is not limited to, information on users, information on user roles, and the data and layout that the user can have on their web based interface. An Administrative Component 136 is provided by the Online Services System 106 to enable the user to define the entities or records and data that a user or set of users are able to access. Upon authentication of the user or set of users, the metadata and data that the user is authorized to receive may be provided to the Adapter 114 for the Occasionally Connected Application 102. The layout that the user expects from the Web Based Interface 132 may be captured and displayed at the Occasionally Connected Application 102 using the Adaptable User Interface Components 134. The Adaptable User Interface Components 134 rely on the description of the entities provided by the metadata to ensure that all aspects of the current design of the entity can be rendered in the user interface of the Occasionally Connected Application 102.

The Adapter 114 may continually retrieve metadata for the Occasionally Connected Application 102 in order to capture any changes to the entities or permissions regarding access to the entities that may then be reflected in the schema for the Application Database 104. For example, the metadata may indicate that a field for an entity "Account" has changed type from integer to long or that a field as been eliminated from the entity. In one or more embodiments, the new metadata may cause a script to be run to generate a new class or set of classes for the entity (e.g., remote objects to access the online service system and local objects for the local database) Occasionally Connected Application 102. In another embodiment, the new metadata may cause additional fields and/or methods to be available for an entity. The Adaptable User Interface Component 134 may rely on a generated class or class that has been modified in accordance with the metadata to provide a current view of the entity for rendering the user interface.

A multi-tenant database may have a dynamic schema and offer the user or administrator the ability to easily change any aspect of the schema (e.g. entities) for the multi-tenant database. In one or more embodiments, the Adapter 114 must capture the metadata that indicates changes at the multi-tenant database and determine how and whether to reflect the changes at the relational database at the Occasionally Connected Application 102. Examples of changes that may occur at the Multi-tenant Database 118 that are reflected in metadata, include, but are not limited to, an administrator indicates an entity may be replicated for the user, an entity is removed from use by a user, a new attribute is added to an entity, an attribute is removed from an entity, and/or metadata about an existing attribute. As used herein, the terms "attribute," "property," and "field" may be used interchangeably to indicate a field of a record or an entity.

After the Multi-tenant Database 118 has been replicated at the Application Database 104, the data and metadata can be synchronized with the Synchronization Component 128. The data from the Multi-tenant Database 118 may be retrieved and stored the Asynchronous Data Component 130. In one or more embodiments, the Asynchronous Data Component 130 is implemented as a cache and data and/or changes to data are captured in the cache. The Adapter 114 may provide the data to the Data Management Services 108 to put the data in the Application Database 104. The Client Device 100 may access or manipulate data in the Application Database 104 when the Occasionally Connected Application 102 is offline using an Application User Interface 138. The Application User Interface 138 may be created using Adaptable User Interface Components 134. When an indication is received by the Occasionally Connected Application Framework 116 that the Occasionally Connected Application 102 is connected to the Online Services System 106, then the Adapter 114 can perform a synchronization of data.

After the data is synchronized, the Client Device 100 may access or manipulate data using the Application User Interface 138 for the Occasionally Connected Application 102. The Client Device 100 may manipulate or access data when the Occasionally Connected Application 102 is offline by using the data locally stored at the Application Database 104. The Data Management Services 108 may have generated classes using metadata from the Multi-tenant Database 118 that can be instantiated and used by the Application User Interface 138 to access/manipulate data in the local Application Database 104. When the Occasionally Connected Application 102 is online, the Application User Interface 138 may access/manipulate data using remote method calls using instantiated classes generated from the metadata from the Multi-tenant Database 118. Alternatively, the Client Device 100 may access the Online Services System 106 over the Network 110 using the Web based Interface 132.

Figure 2:
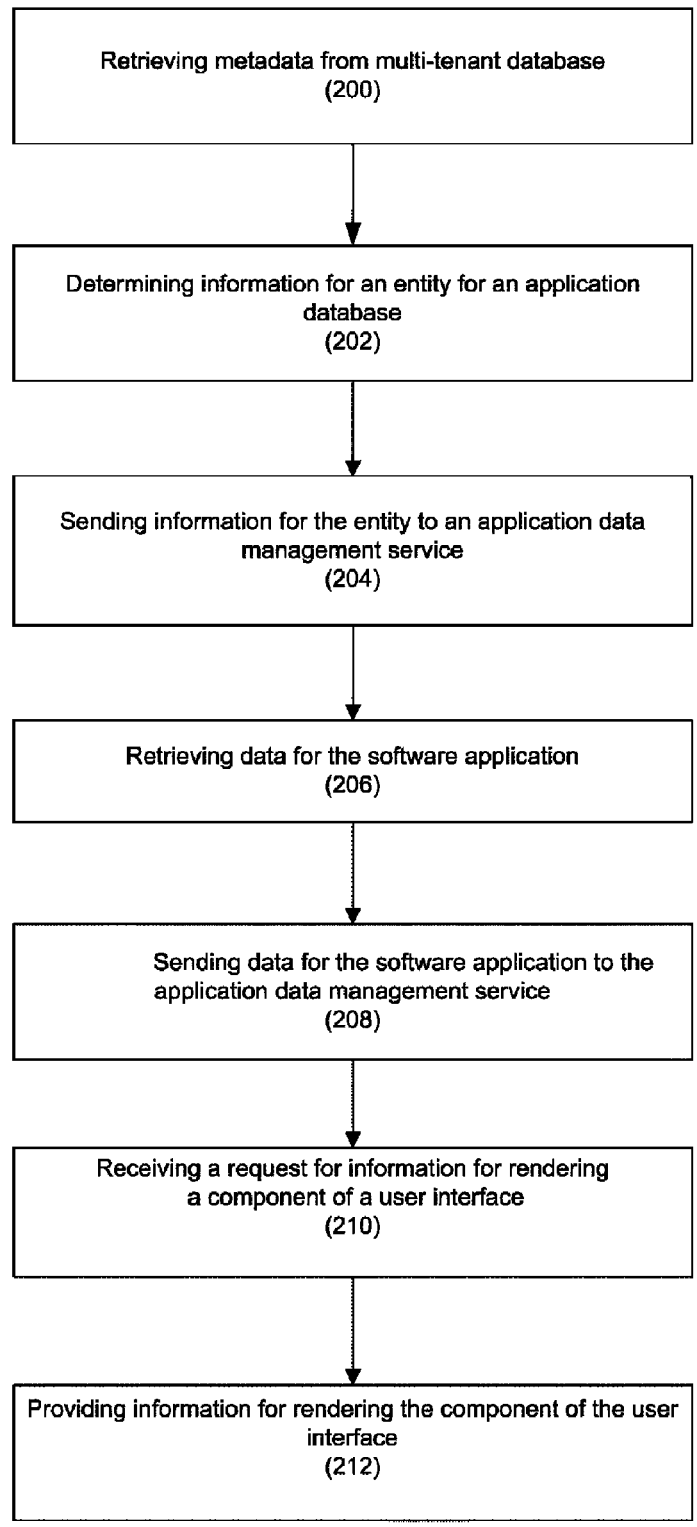
FIG. 2 illustrates an example of a simplified flow diagram of an implementation of maintaining an application occasionally connected to an online services system.

FIG. 2 illustrates an example of a simplified flow diagram of an implementation of maintaining an application occasionally connected to an online services system. Initially, metadata is retrieved that describes at least a portion of an online services system database (200). Upon authentication of a user or set of users, the Occasionally Connected Application Framework 116 Adapter 114 may retrieve metadata describing a portion of the online services system database that the user or set of users is authorized to retrieve. As used herein, the term "user" is meant to be construed broadly to cover a person, a set of users, a device and/or a software application, such that authentication of the user may entail authentication of a person, a software application, a device, or any combination thereof. In one or more embodiments, a user is authenticated by a login username and password.

When the Application Database 104 schema initially needs to be defined or a resynchronization is desired, the Occasionally Connected Application Framework 116 Adapter 114 may retrieve metadata for all tables, entities, and/or records for the portion of the Online Services System Database 118 that the user is allowed to receive. The Adapter 114 may retrieve the metadata from the Online Services System 106 or the Metadata Database 124. Alternatively, the Adapter 114 may retrieve metadata for a portion of the Online Services System Database 118 from the Occasionally Connected Application 102 that has changed since the last synchronization of the Online Services System Database 118 and the Application Database 104. The metadata describes a portion of the Online Services System Database 118 that the user is authorized to have replicated at the Application Database 104. The metadata may provide information on records, tables, and entities of the Online Services System Database 118 that are internal and/or have data that may be manipulated by the user with the Occasionally Connected Application 102. For example, metadata may be provided for a user role table, user account, or a bug management table that are only used internally by the Online Services System 106.

Continuing with FIG. 2, information for an entity of an application database may be determined (202). For example, the metadata from a WSDL file may define an entity that may need to be replicated at the Application Database 104, indicate that an entity has changed, and/or indicate that a user may no longer view the entity. The information for the entity may be sent to an application data management service (204). In one or more embodiments, the information may be an XML file that conveys the metadata for an entity to the Application Data Management Service 108. The Application Data Management Service 108 may alter the classes generated to access the data in the Application Database 104 and/or create or alter the schema with the information for the entity of the application database.

Next, data may be retrieved for the software application (206). The metadata may indicate what data the user is allowed to receive from the Online Services System Database 118 and the data may be retrieved in accordance with metadata. At least a portion of the data for the software application is sent to the application data management service (208). The portion of the data for the Occasionally Connected Application 102 may need to be synchronized with the Online Services System Database 118.

A request may be received for information for rendering a component of a user interface (210). The Occasionally Connected Application Framework 116 may have Adaptable User Interface Components 134. The Adaptable User Interface Components 134 may mimic the look and feel of the Online Services System or the user can use the Adaptable User Interface Components 134 to build custom user interfaces. The metadata may define the look and feel of the Online Services System 106 and/or define the entity fields that the user is able to access for the user interface.

Information may be provided for rendering the component of the user interface for the software application in accordance with metadata (212). The metadata may indicate the data that the user is allowed to have displayed and/or provide a layout that is available at the Online Services System 106. The Adaptable User Interface Component 134 may render user interface elements that include, but are not limited to, field values of an entity, entity field name and the field value, the entire entity, or the entity as displayed at the online service. The Adaptable User Interface Component 134 may optionally provide internationalization and localization capabilities. For example, the metadata may indicate the language for the user and the user interface may display the entity in the appropriate language for the user.

Figure 3:
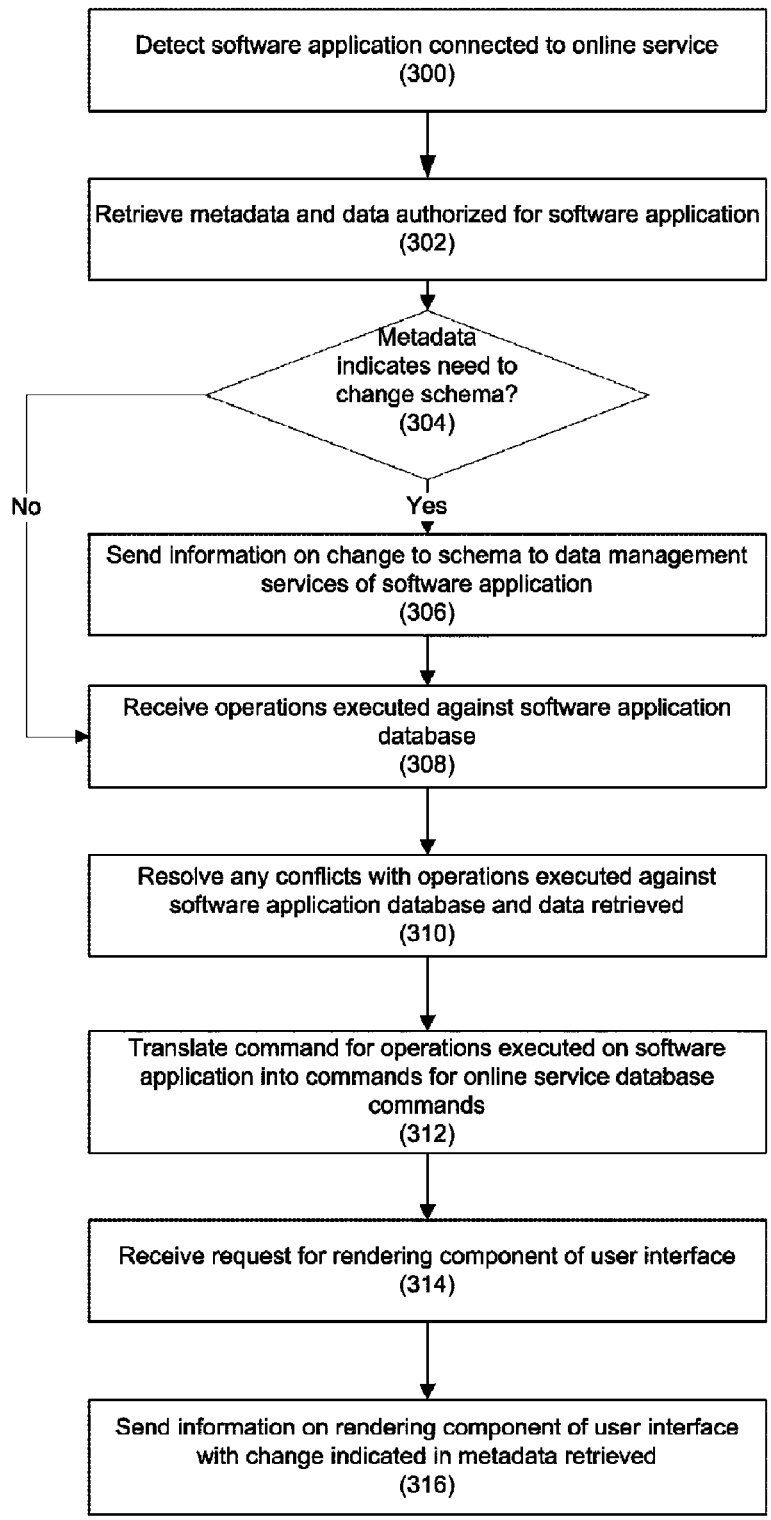
FIG. 3 illustrates an example of a more detailed flow diagram of an implementation of maintaining an application occasionally connected to an online services system.

FIG. 3 illustrates an example of a more detailed flow diagram of an implementation of maintaining an application occasionally connected to an online services system. Initially, a software application connection to an online service system may be detected (300). Upon detection of a connection, replication and/or synchronization of data may be attempted between the Application Database 104 and the Multi-tenant Database 118. The user may be authenticated with a login username/password to establish the connection to the Online Services System 106.

Next, metadata and data authorized for the software application may be retrieved (302). When an application is first created or metadata changes indicate a full synchronization is desired, all metadata and data concerning the entities that the user is authorized to receive may be retrieved by the Adapter 114 of the Occasionally Connected Application Framework 116. The Data Management Services 108 may generate a schema for the Application Database 104 and generate classes to be remote objects representing the entities at the Application Database 104 and the Multi-tenant Database 118 when instantiated. The Data Management Services 108 may fill the tables of the Application Database 104 with the retrieved data.

Alternatively, metadata and data that may affect the entities for a user at the Occasionally Connected Application 102 may be incrementally received from the Multi-tenant Database 118. For example, the metadata and data for a portion of the entities that a user is authorized to receive may be received each time a connection is detected or when the user designates a desire to synchronize data. In one or more embodiments, the classes generated are dynamic and are not fixed at compile time so changes indicated by metadata and data that affect an entity may be reflected at the Occasionally Connected Application 102 without a full synchronization. A dynamic class may be compiled and a new attribute or property may be added to the class at runtime. For example, if metadata indicates that a "Contact" entity now has a new SocialSecurityNumber field, you will be able to use an instance of the Contact class and use get/set methods for the property contact.SocialSecurityNumber, even though the Contact class was initially compiled without this property.

A determination may be made as to whether the metadata indicates a need to change the schema for the application database (304). If a determination is made that the metadata indicates a need to change the schema, then information may be sent on the change necessary for an entity of the schema to data management services of software application (306). If the metadata indicates a change that requires a full synchronization is necessary and Occasionally Online Application 102 is in use by the user, then the user may be prompted if a shutdown of the application and synchronization is desired or alerted that a full synchronization may be necessary when the application is restarted. For example, if the metadata indicates that a field was added to an entity the underlying data for the field of the entity is not present in the Application Database 104, then a full synchronization may be desired. Alternatively, metadata may not indicate a need to change the schema (306), operations may be received that are to be executed on against the software application database (308).

Continuing with FIG. 3, operations may be received to be executed against software application database (308). The operations that have been or will be executed at the Occasionally Connected Application 102 may be stored at the Occasionally Connected Application 102.

The Occasionally Connected Application Framework 116 may provide the ability to resolve any conflicts with operations executed against software application database and data retrieved (310). In one or more embodiments, a user interface is provided for allowing the user to manually resolve conflicts between the data locally stored and the data at the online services system. Alternatively, the Occasionally Connected Application Framework 116 may resolve conflicts for the user.

The commands for operations executed on software application may be translated into commands for online service database commands (312). The translated commands for the operations executed against the Application Database 104 may then be executed against the Multi-tenant Database 118. If conflicts or errors occur when the translated commands are executed against the Multi-tenant Database 118, then the user may again be prompted to resolve conflicts.

In a preferred embodiment, all operations are executed and committed at the Application Database 104, and the operations are stored for execution against the Multi-tenant Database 118. Each stored operations is then executed against the Multi-tenant Database 118 and if there is an error, then the operation is saved for conflict resolution. Each user may have their own Data Management Service 108 and Conflict Store 122 for stored conflicts.

Next, a request may be received for rendering component of user interface (314). Information may be sent on rendering a component of user interface (316). Metadata may indicate that there is a change in an entity that a component of user interface is rendering. The Data Management Services 108 may have altered the class associated with the entity to reflect the change and the change will be reflected in the information sent for rendering the component of the user interfaces. For example, if a field was added to an entity, Data Management Services 108 may have changed the remote object for the entity to have set/get functions for the field and the Adaptable User Interface Component 134 may access the field with the recently changed object.

Figure 4:
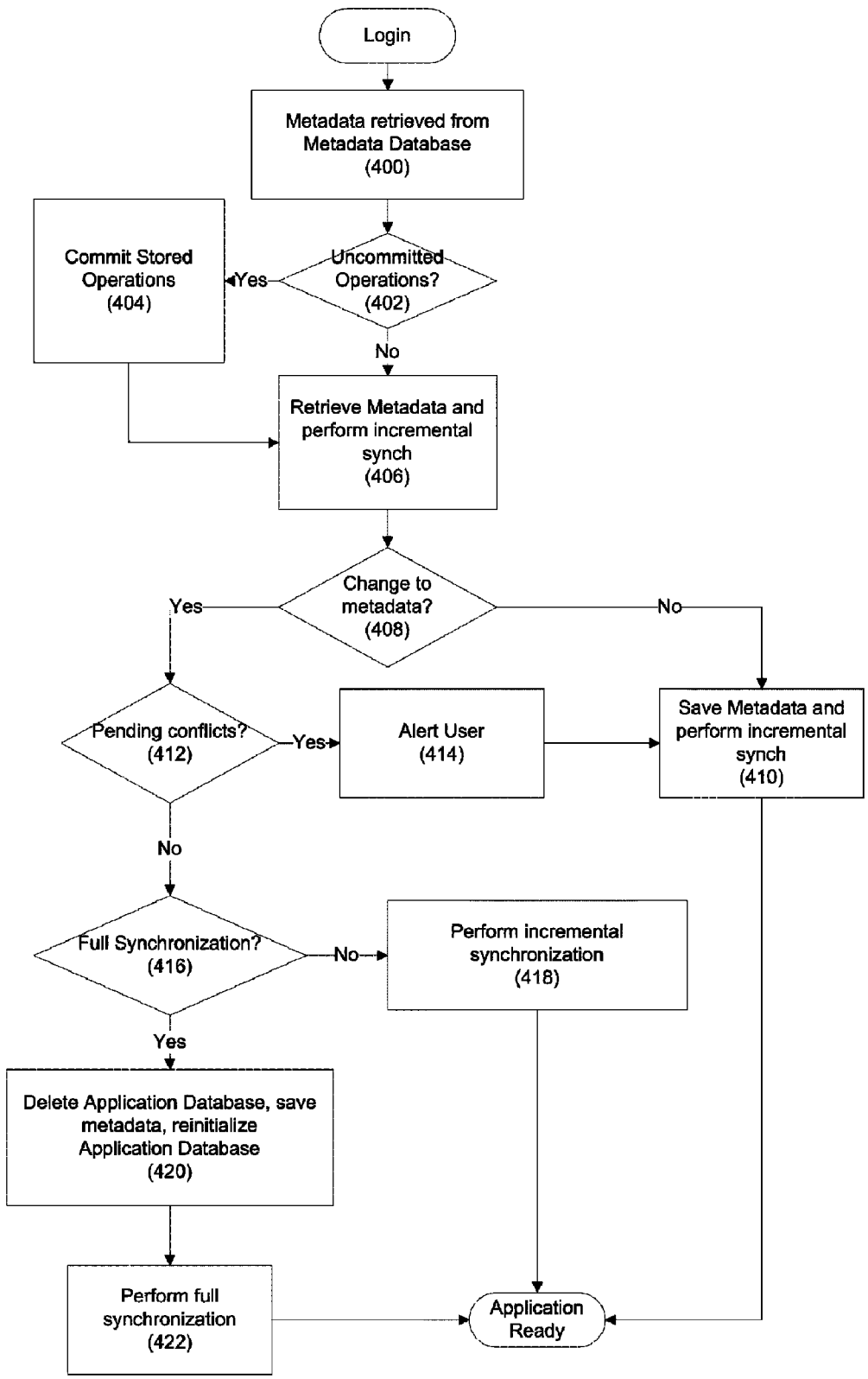
FIG. 4 illustrates an example of a more detailed flow diagram of an implementation of maintaining an application occasionally connected to an online services system.

FIG. 4 illustrates an example of a more detailed flow diagram of an implementation of maintaining an application occasionally connected to an online services system. Initially, a user is authenticated by logging in to the Occasionally Connected Application 102. Metadata for the user and the application may be retrieved from the Metadata Database 124 (400). The Data Management Services 108 may be initialized with the metadata. In an embodiment, the metadata may indicate the classes that should be instantiated for the Occasionally Connected Application 102 and/or the user interface that may be displayed for the user. In another embodiment, the metadata is interpreted by the user interface at runtime or at the time of display.

Next, a determination is made as to whether there are uncommitted operations (402). If there are uncommitted operations stored, an attempt is made to commit the stored operations at the Multi-tenant Database 118 (404). The Adapter 114 translates the operations for the Application Database 104 to operations for the Multi-tenant Database 118 and an attempt is made to execute the operations at the Multi-tenant Database 118. Alternatively, there may be no stored operations to commit (402).

Continuing with FIG. 4, the metadata may be retrieved from the Multi-tenant Database 118 and an incremental synchronization may be performed (406). An incremental synchronization may be performed at predefined increments and/or after an operation is executed at the Multi-tenant Database 118. The Adapter 114 may retrieve data that has changed at the Multi-tenant Database 118 for entities that the user is authorized to have replicated for the Occasionally Connected Application 102.

Next, a determination is made as to whether there is a change to the metadata (408) that may affect the Occasionally Connected Application 102. If there are no metadata changes, then the metadata may be saved to a Metadata Database 124 and incremental synchronizations may continue to be performed throughout the application execution (410).

Continuing with FIG. 4, if there is a change to the metadata (408) that may affect the Occasionally Connected Application 102, then a determination is made as to whether there are any pending conflicts (412). The change to metadata may affect an entity in the Application Database 104 or the schema of the Application Database 104. If there are pending conflicts (412), then the user is alerted (414), such as with a user interface prompt, and the metadata may be saved to a Metadata Database 124 and incremental synchronizations may continue to be performed throughout the application execution (410).

Continuing with FIG. 4, if there are no pending conflicts (412), then a determination is made as to whether a full synchronization may be performed (416). The user may be prompted to choose whether to perform a full synchronization. If the user chooses not to perform a full synchronization (416), then incremental synchronization may be performed (418) and the application may continue to execute.

Alternatively, if a full synchronization (416) is requested, then the Application Database 104 may be deleted, the metadata may be saved to the Metadata Database 124, and the Application Database 104 may be reinitialized (420). Next, a full synchronization is performed (422). For a full synchronization, the metadata may be used to create the schema for the Application Database 104. In a preferred embodiment, the classes to access the remote objects as well as the classes to access the local database may be generated and instantiated and the data from the Multi-tenant Database 118 may be accessible from the remote objects or from directly accessing the Application Database 104.

Metadata Database

In a preferred embodiment, after a user has been authenticated by logging in to the Occasionally Connected Application 102, a call is issued to get the metadata for the entities identified for the user by the administrator. For each entity, additional user interface metadata is retrieved for use with the Adaptable User Interface Components 134. A different metadata database may be created for each user which may allow multiple users to login to the same application without overwriting the metadata database.

Synchronization

In a preferred embodiment, a synchronization API call for data returns a set of created/updated/deleted objects since the last synchronization. The Adapter 114 may convert each returned object into an object for the Application Database 104 and requests the Data Management Service 108 store the object in the Application Database 104. In a preferred embodiment, a partial synchronization may be performed after every save/delete/update operation at the Multi-tenant Database 118. The inventors note that by performing synchronization after an operation at the Multi-tenant Database 118 any effects of the previous operation may be reflected at the Application Database 104 and the record that was just affected by the operation may be saved to the Application Database 104. In another preferred embodiment, an automatic periodic synchronization may be performed after a default interval (e.g., 20 minutes of inactivity). If the metadata changes are detected during the synchronization, a flag may be set in a preferred embodiment.

Figure 5B:
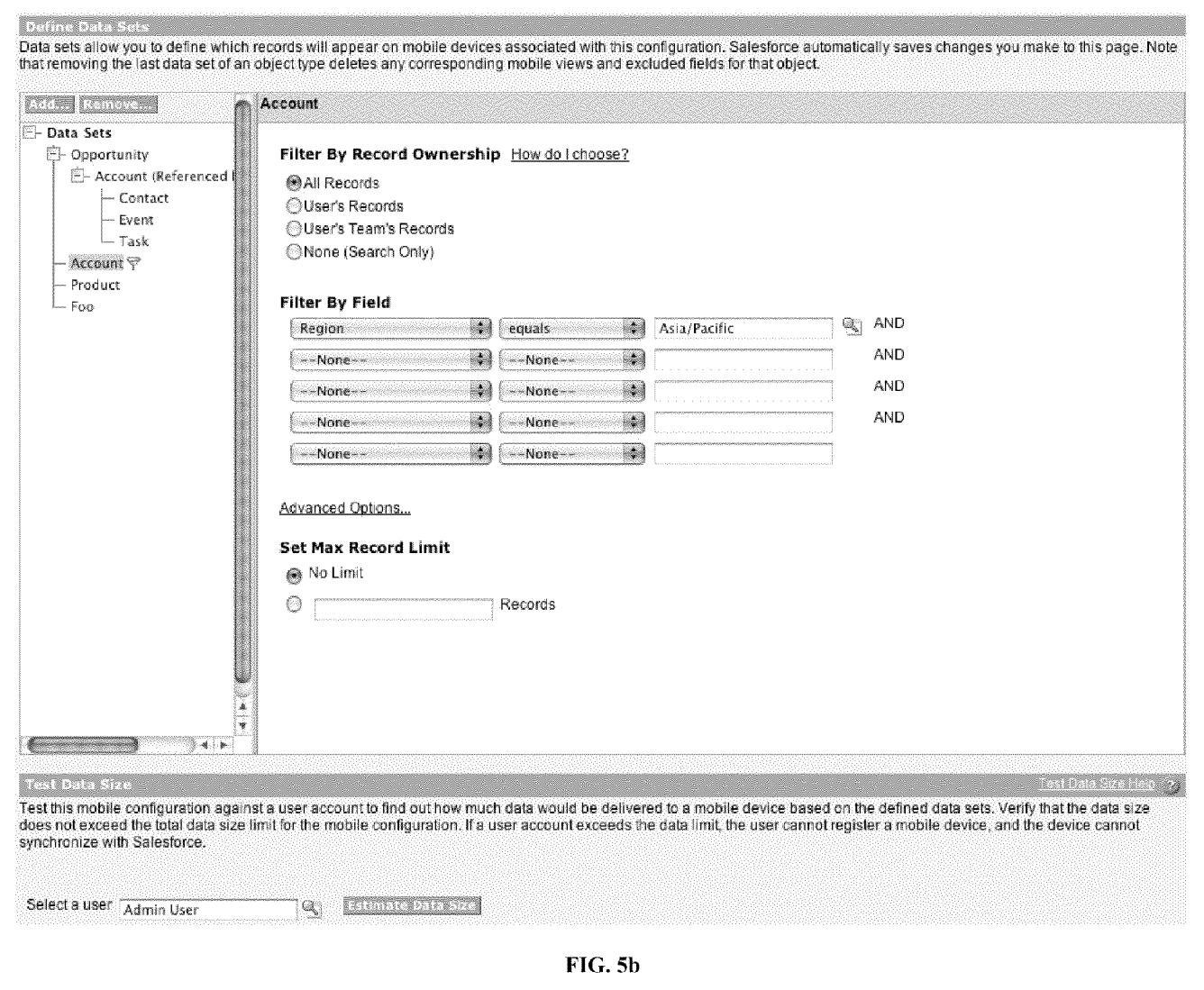

FIGS. 5a and 5b illustrates a screenshot of an administration console for an implementation of maintaining an application occasionally connected to an online services system. The Client Admin Console as illustrated allows Client administrators to define client configurations for user profiles and/or individual users. The configuration defines a set of data that gets synchronized to an application. In another embodiment, the administrator is able to define a set of data that can be synchronized for a user and a specific application. A unique or nearly unique identifier may be assigned to identify the set of data/metadata stored in the Asynchronous Data Component 130. The identifier may be assigned to a set of data/metadata stored for a particular application, a particular user and application, and/or a number indicating a count for times synched.

FIG. 6a illustrates a screenshot of a conflict resolution user interface for an implementation of maintaining an application occasionally connected to an online services system. FIG. 6a provides a detailed view of specific errors and the related error messages for conflicts and allows the user to resolve the error by entering a new/correct value in text fields for conflict fields on records in the user interface.

Figure 6B:
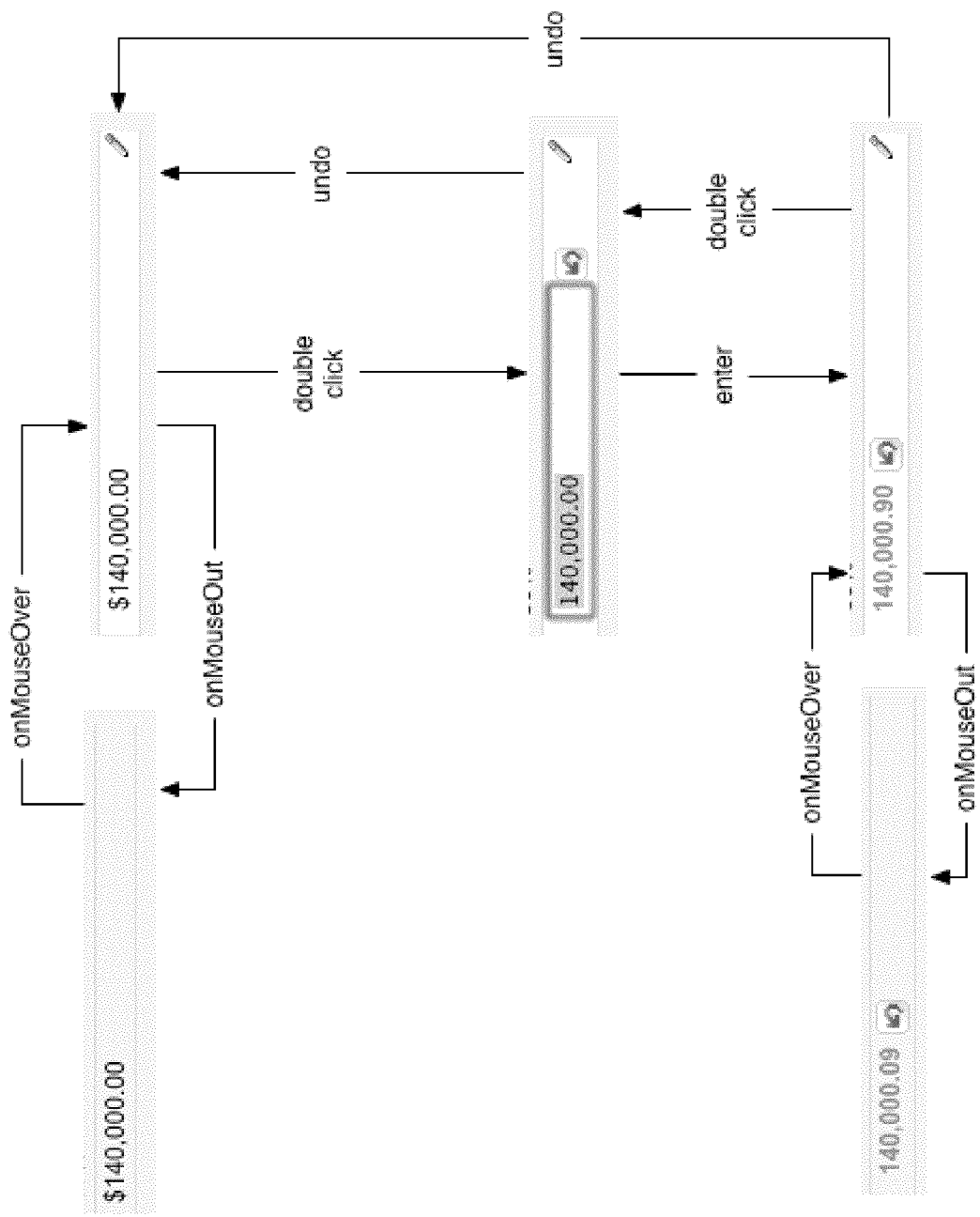
FIG. 6b illustrates a screenshot of a user interface for an implementation of maintaining an application occasionally connected to an online services system.

FIG. 6b illustrates a screenshot of a user interface for an implementation of maintaining an application occasionally connected to an online services system. FIG. 6b provides an example of an inline-edit lifecycle of a user interface element created with an Adaptable User Interface Components 134. In the example, a FieldElement widget/component displays the value of an entity field. An example of how to incorporate the component in an user interface using MXML code, is as follows:

<stratus:FieldElement     id="_fieldElement"     field="Account.Website"/>.

Continuing with the same example, to render a value for a field the following call may be made with an instantiation of a generated class for the entity: "_fieldElement.render(account);". The call will render the value of the field "Website" of the account object (e.g., instantiated "account" class or instance of "account" class). In a preferred embodiment, the "FieldElement" widget can render any field when a fully qualified field name is passed (e.g. Account.Website for an instance of Account class, Opportunity.Status for an instance of Opportunity class). A user can build their own interface using the FieldElement widgets. In this example, FieldElement renders the URL field as:

http://www.12345asdf.net.

Internally, the FieldElement widget may act as container that simply implements the behavior of the full inline-edit lifecycle (e.g., showing the pen icon, monitoring on MouseOver/Out events, showing the undo icon after being changed, etc.). Displaying the real value of the field may be delegated to a FieldComponent which is injected into the FieldElement. The FieldElement may inspect the fully qualified field name to decide which FieldComponent to use at runtime. Examples of other field components include, but are not limited to, the following: CheckboxComponent, CurrencyComponent, NumberComponent, and PercentComponent.

In another example, a label and a field may be displayed with an Adaptable User Interface Components 134 "LabelAndField." An example of how to include this component in a user interface is as follows: <stratus: LabelAndField field="Account.Website"/>. A call to the render method for the "LabelAndField" component displays:

Website http://www.12345asdf.net.

FIG. 6c illustrates a screenshot of a user interface for an implementation of maintaining an application occasionally connected to an online services system. FIG. 6c provides an example of an Adaptable User Interface Components 134 component that allows LabelAndField/FieldElement widgets to be grouped together to display data about the same object.

For example, if you want to display five fields from the same Opportunity object, a "Container" Adaptable User Interface Components 134 may be used. In a preferred embodiment, a FieldContainer widget manages all the FieldElement widgets it contains. It allows the programmer to simply call render or is Valid on the FieldContainer instead of having to manage each and every LabelAndField/FieldElement. An example of MXML code using a FieldContainer to display FIG. 6c is, as follows:

```
<stratus: FieldContainer id= "_editFieldContainer" width= "100%">
    <stratus: LabelAndField field= "Account.Name" />
    <stratus: LabelAndField field= "Account.BillingStreet[Group]" />
    <stratus: LabelAndField field= "Account.ParentId" />
    <stratus: LabelAndField field= "Account.Type" />
    <stratus: LabelAndField field= "Account.Website" />
    <stratus: LabelAndField field= "Account.CreatedDate" />
    <stratus: LabelAndField field= "Account.AnnualRevenue" />
</stratus: FieldContainer>
```

FIG. 6d illustrates a screenshot of a user interface for an implementation of maintaining an application occasionally connected to an online services system. FIG. 6d illustrates an example of an Adaptable User Interface Components 134 that displays an entity or portion of an entity that the user is authorized to view. In a preferred embodiment, the retrieved metadata for the entity will provide the ability to display a layout similar to the online service user interface. The following is an example of MXML code to display the entity in FIG. 6d:

<stratus:EntityContainer id="_editFieldContainer" width="100%"/>.

System Overview

Figure 7:
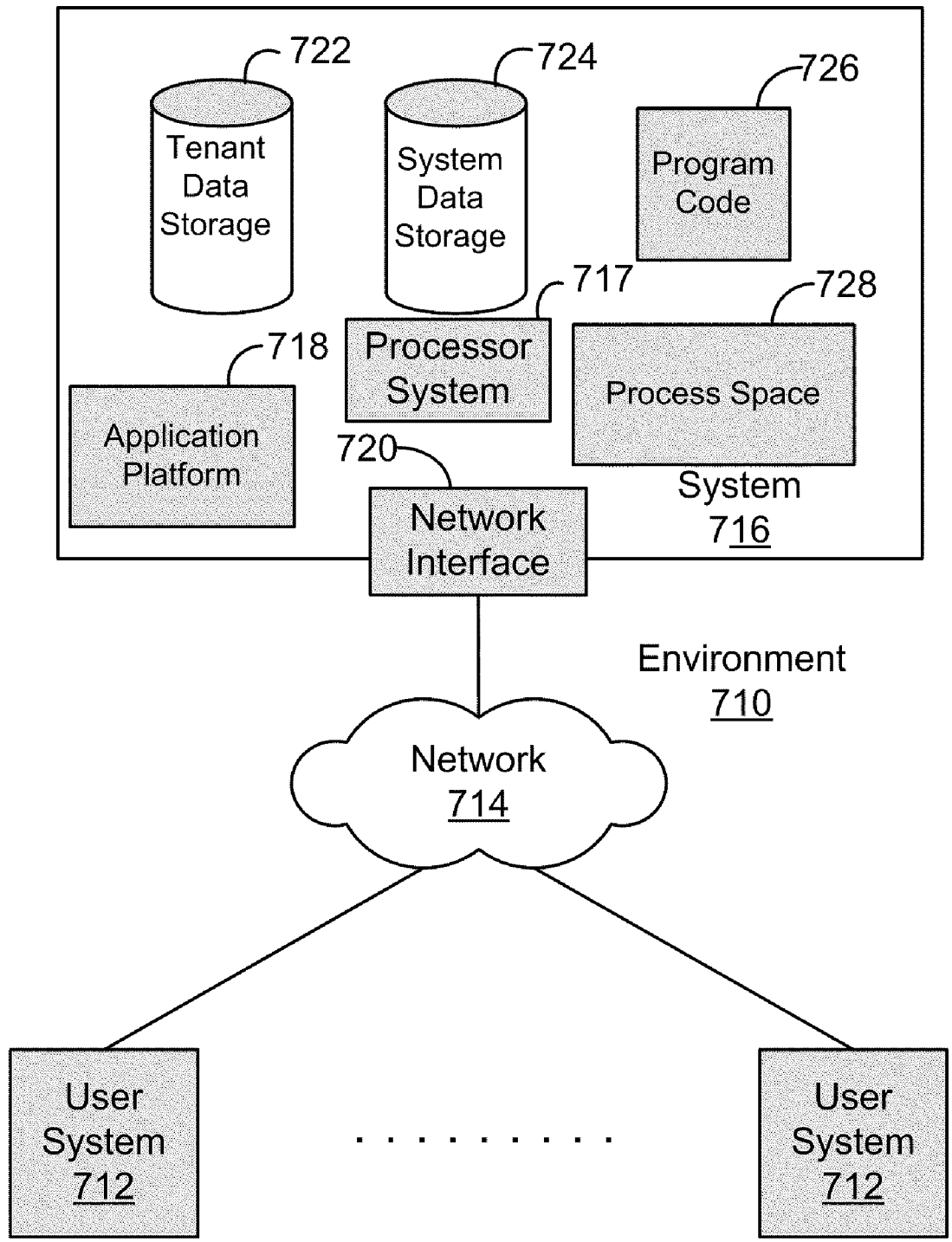
FIG. 7 illustrates a block diagram of an example of an environment wherein an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
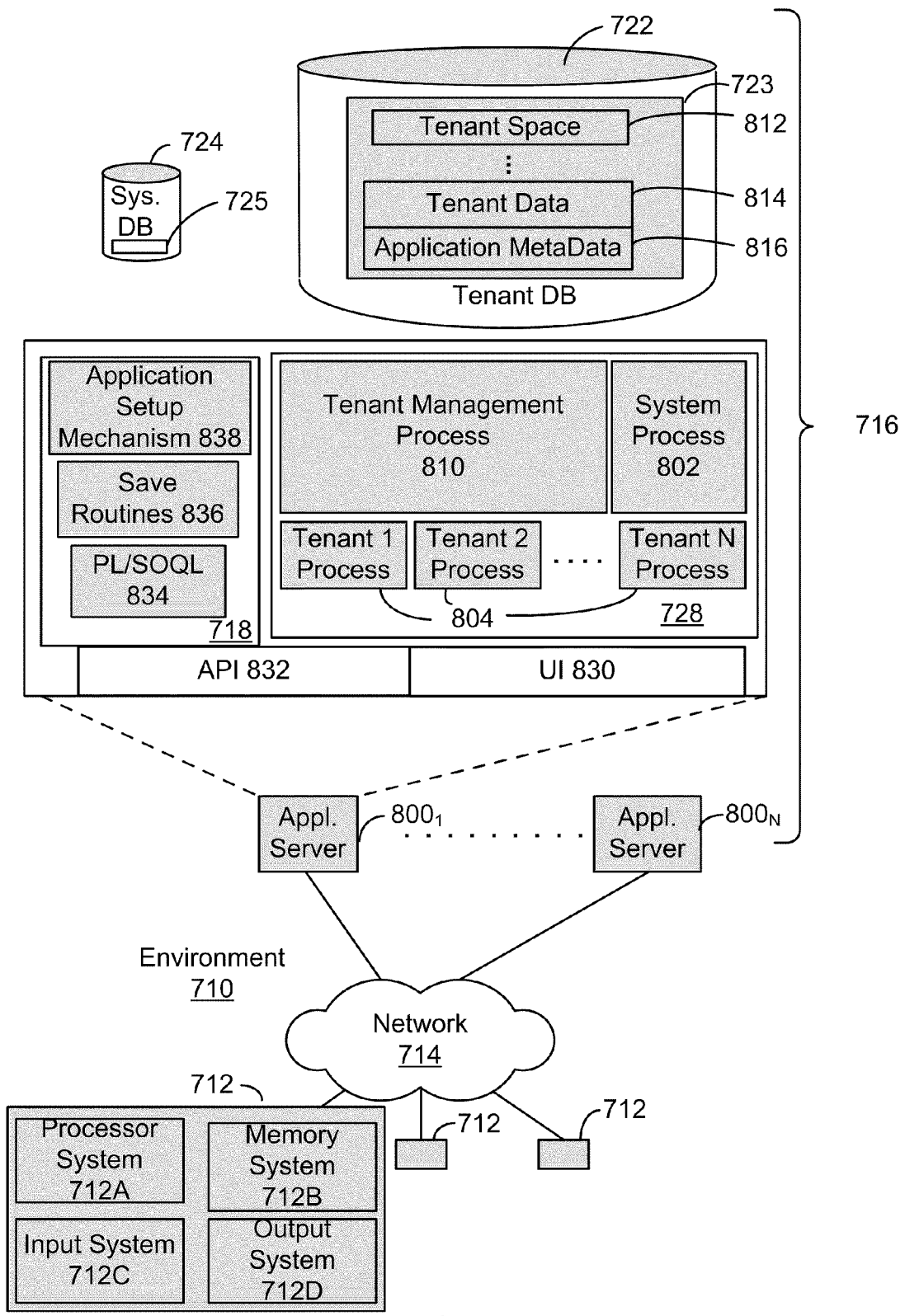
FIG. 8 illustrates a block diagram of an embodiment of elements of FIG. 1 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 8001-800N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 8001 might be coupled via the network 714 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for maintaining applications that are occasionally connected to an online services system, the method comprising:
retrieving metadata describing at least a portion of an online services database, wherein the at least a portion of the online services database is authorized for replication at a software application;
determining information for an entity for an application database in accordance with metadata;
sending information for the entity to an application data management service;
retrieving data for the software application from the online services database in accordance with metadata;
sending at least a portion of the data for the software application to the application data management service, wherein the at least a portion of the data for the software application should be synchronized with the online services database;
receiving a request for information for rendering a component of a user interface;
providing information for rendering the component of the user interface for the software application;
receiving an indication that an online services system is available over a network;
detecting a change of at least one of data for the application database and metadata; and
replicating the entity at the application database in accordance with the detected change.

2. The method of claim 1, further comprising:
synchronizing data at the application database with data at the online services database in accordance with the detected change.

3. The method of claim 1, further comprising:
translating a command for an operation executed at the application database into a command for an online services database; and
resolving any conflicts with operations executed against software application database and data retrieved.

4. The method of claim 1, further comprising:
translating a command for an operation executed at the application database on a bug management entity into a command for an operation on the online services database; and
sending the command for the operation on the online services database.

5. The method of claim 1, further comprising:
detecting software application not connected to the online services system;
receiving a request to perform an operation; and
performing operation on data at application database.

6. The method of claim 1, further comprising:
determining information for at least a portion of the schema for an application database in accordance with metadata; and
sending information to an application data management service to replicate online services database.

7. The method of claim 1, further comprising:
receiving information authenticating a user.

8. A computer-readable storage medium having one or more instructions thereon for maintaining applications that are occasionally connected to an online services system, the instructions when executed by one or more processors causing the one or more processors to carry out:
retrieving metadata describing at least a portion of an online services system database, wherein the at least a portion of the online services system database is authorized for replication at a software application;
determining information for an entity for an application database in accordance with metadata;
sending information for the entity to an application data management service;
retrieving data for the software application from the online services database in accordance with metadata;
sending at least a portion of the data for the software application to the application data management service, wherein the at least a portion of the data for the software application should be synchronized with the online services system database;
receiving a request for information for rendering a component of a user interface;
providing information for rendering the component of the user interface for the software application;
receiving an indication that an online services system is available over a network;
detecting a change of at least one of data for the application database and metadata; and
replicating of the entity at the application database in accordance with the detected change.

9. The computer-readable storage medium of claim 8, further comprising one or more instructions when executed by one or more processors causing the one or more processors to carry out:
synchronizing data at the application database with data at the online services database in accordance with the detected change.

10. The computer-readable storage medium of claim 8, further comprising one or more instructions when executed by one or more processors causing the one or more processors to carry out:
translating a command for an operation executed at the application database into a command for an online services database.

11. The computer-readable storage medium of claim 8, further comprising one or more instructions when executed by one or more processors causing the one or more processors to carry out:
resolving any conflicts with operations executed against software application database and data retrieved.

12. The computer-readable storage medium of claim 8, further comprising one or more instructions when executed by one or more processors causing the one or more processors to carry out:
translating a command for an operation executed at the application database on a bug management entity into a command for an operation on the online services database; and
sending the command for the operation on the online services database.

13. The computer-readable storage medium of claim 8, further comprising one or more instructions when executed by one or more processors causing the one or more processors to carry out:
detecting software application not connected to the online services system;
receiving a request to perform an operation; and
performing operation on data at application database.

14. The computer-readable storage medium of claim 8, further comprising one or more instructions when executed by one or more processors causing the one or more processors to carry out:
determining information for at least a portion of the schema for an application database in accordance with metadata; and
sending information to an application data management service to replicate online services database.

15. The computer-readable storage medium of claim 8, further comprising one or more instructions when executed by one or more processors causing the one or more processors to carry out:
receiving information authenticating a user.

16. An apparatus for maintaining applications that are occasionally connected to an online services system in a multi-tenant database system, the apparatus comprising:
a processor; and
a non-transitory computer readable storage medium storing one or more sequences of instructions which, when executed by the processor, cause the processor to carry out:
retrieving metadata describing at least a portion of an online services system database, wherein the at least a portion of the online services system database is authorized for replication at a software application;
determining information for an entity for an application database in accordance with metadata;
sending information for the entity to an application data management service;
retrieving data for the software application from the online services database in accordance with metadata;
sending at least a portion of the data for the software application to the application data management service, wherein the at least a portion of the data for the software application should be synchronized with the online services system database;

receiving a request for information for rendering a component of a user interface; and providing information for rendering the component of the user interface for the software application;

receiving an indication that an online services system is available over a network;

detecting a change of at least one of data for the application database and metadata; and performing replication of the entity at the application database in accordance with the detected change.

17. The apparatus of claim 16, further comprising one or more stored sequences of instructions which, when executed by the processor, cause the processor to carry out:

synchronizing data at the application database with data at the online services database in accordance with the detected change.

18. The apparatus of claim 16, further comprising one or more stored sequences of instructions which, when executed by the processor, cause the processor to carry out:

translating a command for an operation executed at the application database into a command for an online services database.

19. The apparatus of claim 16, further comprising one or more stored sequences of instructions which, when executed by the processor, cause the processor to carry out:

resolving any conflicts with operations executed against software application database and data retrieved.

20. The apparatus of claim 16, further comprising one or more stored sequences of instructions which, when executed by the processor, cause the processor to carry out:

translating a command for an operation executed at the application database on a bug management entity into a command for an operation on the online services database; and sending the command for the operation on the online services database.

* * * * *